(12) United States Patent
Schroeder

(10) Patent No.: US 10,737,554 B2
(45) Date of Patent: Aug. 11, 2020

(54) METHOD FOR OPERATING AN ELECTRIC MOTOR COOLANT COMPRESSOR

(71) Applicant: Brose Fahrzeugteile GmbH & Co. Kommanditgesellschaft, Wuerzburg, Wuerzburg (DE)

(72) Inventor: Hans-Joachim Schroeder, Wiesbaden (DE)

(73) Assignee: Brose Fahrzeugteile GmbH & Co. Kommanditgesellschaft, Wuerzburg, Wuerzburg (DE)

( * ) Notice: Subject to any disclaimer, the term of this patent is extended or adjusted under 35 U.S.C. 154(b) by 142 days.

(21) Appl. No.: 16/077,226

(22) PCT Filed: Dec. 15, 2016

(86) PCT No.: PCT/EP2016/081111
§ 371 (c)(1),
(2) Date: Aug. 10, 2018

(87) PCT Pub. No.: WO2017/108556
PCT Pub. Date: Jun. 29, 2017

(65) Prior Publication Data
US 2019/0047372 A1    Feb. 14, 2019

(30) Foreign Application Priority Data

Dec. 23, 2015 (DE) .......... 10 2015 226 719
Apr. 27, 2016 (DE) .......... 10 2016 207 129

(51) Int. Cl.
*B60H 1/32*     (2006.01)
*G01K 7/42*     (2006.01)

(52) U.S. Cl.
CPC .......... *B60H 1/3225* (2013.01); *G01K 7/427* (2013.01); *B60H 2001/3292* (2013.01); *F25B 2500/19* (2013.01); *G01K 2201/02* (2013.01)

(58) Field of Classification Search
CPC .......... B60H 1/3225; B60H 2001/3255; B60H 2001/3292; G01K 7/427; G01K 2201/02; F25B 2500/19
See application file for complete search history.

(56) References Cited

U.S. PATENT DOCUMENTS 6,615,594 B2    9/2003   Jayanth et al.
6,758,050 B2    7/2004   Jayanth et al.
(Continued)

FOREIGN PATENT DOCUMENTS

CN      1821577 A     8/2006
CN    103140681 A     6/2013
(Continued)

OTHER PUBLICATIONS

Korean Office Action dated Sep. 20, 2019 in corresponding application 10-2018-7021005.

*Primary Examiner* — Marc E Norman
(74) *Attorney, Agent, or Firm* — Muncy, Geissler, Olds & Lowe, P.C.

(57) ABSTRACT

A method for operating an electric motor-driven refrigerant compressor of a motor vehicle is provided. A first temperature of a power semiconductor is measured, and a second temperature of the power semiconductor is determined using a theoretical model of the motor-driven refrigerant compressor. A difference between the first temperature and second temperature is determined. A fault is detected if the difference is greater than a first threshold. The invention further relates to a motor-driven refrigerant compressor of a motor vehicle, to the use of a motor-driven refrigerant compressor, and to a motor vehicle comprising a refrigerant circuit.

13 Claims, 3 Drawing Sheets

(56) References Cited

U.S. PATENT DOCUMENTS

| | | |
|---|---|---|
| 6,892,550 B2 | 5/2005 | Takemoto et al. |
| 9,018,879 B2 | 4/2015 | Watanabe |
| 9,541,907 B2 | 1/2017 | McSweeney |
| 2002/0108384 A1 | 8/2002 | Higashiyama |
| 2009/0094997 A1 | 4/2009 | McSweeney |
| 2013/0175964 A1 | 7/2013 | Watanabe |
| 2015/0323396 A1 | 11/2015 | West et al. |
| 2015/0349516 A1* | 12/2015 | Fuchs .................... H01L 23/34 361/106 |

FOREIGN PATENT DOCUMENTS

| | | |
|---|---|---|
| JP | H 03-195394 A | 8/1991 |
| JP | 2004069138 A | 3/2004 |
| KR | 20100057900 A | 6/2010 |

\* cited by examiner

METHOD FOR OPERATING AN ELECTRIC MOTOR COOLANT COMPRESSOR

This nonprovisional application is a National Stage of International Application No. PCT/EP2016/081111, which was filed on Dec. 15, 2016, and which claims priority to German Patent Application No. 10 2015 226 719.9, which was filed in Germany on Dec. 23, 2015, and German Patent Application No. 10 2016 207 129.7, which was filed in Germany on Apr. 27, 2016, which are all herein incorporated by reference.

BACKGROUND OF THE INVENTION

Field of the Invention

The invention relates to a method for operating an electric motor-driven refrigerant compressor of a motor vehicle and to an electric motor-driven refrigerant compressor of a motor vehicle comprising a power semiconductor. A power semiconductor in this case is understood to be a semiconductor, in particular a semiconductor switch, that can carry an electric current of at least 1 A. The invention further relates to the use of a motor-driven refrigerant compressor and to a motor vehicle having a refrigerant circuit comprising a motor-driven refrigerant compressor.

Description of the Background Art

Motor vehicles usually have an air conditioning system by means of which the temperature of an interior of the motor vehicle is controlled. The required energy storage means, such as a high-voltage battery, are also cooled in vehicles powered by an electric motor. The air conditioning system has a refrigerant circuit which comprises a refrigerant compressor, a condenser connected downstream of the compressor, and an evaporator connected fluidically downstream of the condenser. A further heat exchanger is fluidically connected downstream thereto and is in thermal contact with a blower line, which leads into the interior of the motor vehicle, or with any energy cells of the high-voltage energy storage means. The refrigeration circuit is filled with a refrigerant, such as R134a, R1234yf, or $CO_2$.

During operation, a pressure of the refrigerant is increased by means of the refrigerant compressor, which leads to an increase in the refrigerant temperature. The refrigerant is conveyed to the condenser, which is in thermal contact with an environment of the motor vehicle. Here, there is a temperature reduction of the refrigerant, whose pressure is in turn reduced to the original pressure in the downstream evaporator, which is why the temperature of the refrigerant is further reduced. In the downstream heat exchanger, thermal energy is transferred from the component, thermally contacted with the heat exchanger, to the refrigerant, resulting in a cooling of the component and heating of the refrigerant. The heated refrigerant is again supplied to the refrigerant compressor to close the refrigerant circuit.

The refrigerant compressor is usually driven by a belt drive from an internal combustion engine of the motor vehicle and has a compressor head, which is, for example, a scroll compressor head. If the air conditioning system is part of a motor vehicle that does not comprise an internal combustion engine, the refrigerant compressor has an electric motor, by means of which the compressor head is driven. Here, the drive speed and thus the cooling capacity of the air conditioning system are adjusted based on a temperature set by the motor vehicle's user or a realized temperature of the high-voltage battery.

SUMMARY OF THE INVENTION

The invention is based on the object of providing a particularly suitable method for operating a motor-driven refrigerant compressor of a motor vehicle and a motor-driven refrigerant compressor of a motor vehicle, as well as a particularly suitable motor vehicle with a motor-driven refrigerant compressor, wherein in particular safety is increased and preferably manufacturing costs are reduced.

With regard to the method, said object is achieved according to the invention by the features of claim 1, with regard to the motor-driven refrigerant compressor by the features of claim 7, and with regard to the motor vehicle by the features of claim 10. Advantageous refinements and embodiments are the subject of the particular dependent claims.

The method is used to operate a motor-driven refrigerant compressor, which consequently comprises an electric motor drive with an electric motor. The motor-driven refrigerant compressor is in particular a component of a motor vehicle refrigerant circuit, by means of which, for example, the temperature of the interior of the motor vehicle and/or cooling of an energy storage means of the motor vehicle is controlled. In particular, the motor-driven refrigerant compressor comprises a compressor head, for example, a scroll compressor. Particularly preferably, a refrigerant is compressed by means of the motor-driven refrigerant compressor, in particular a chemical refrigerant such as R134a or R1234yf. Alternatively, $CO_2$ is used as the refrigerant. The electric motor is particularly preferably a brushless electric motor, preferably a brushless DC motor (BLDC).

The motor-driven refrigerant compressor comprises a power semiconductor, in particular a power semiconductor switch. The power semiconductor is in this case provided and set up to carry, preferably to switch, an electrical current of at least 1 A, 2 A, 5 A, or 10 A. In particular, current is supplied to the electric motor by means of the power semiconductor, for which, in particular, pulse width modulation takes place by means of the power semiconductor switch. In other words, a PWM signal is output by means of the power semiconductor switch, which signal is preferably supplied to a coil winding of the electric motor, in particular a stator of the electric motor. Expediently, the power semiconductor is subjected to a PWM control of a driver circuit, as a function of which the power semiconductor switch is shifted from an electrically conductive to an electrically non-conductive state. The motor-driven refrigerant compressor in particular comprises an electronic inverter, which is supplied, for example, from a DC voltage network. The inverter preferably has a power output stage, which comprises the power semiconductor switch, in particular a number thereof. The power semiconductor switches can switch the electric current required for the required performance of the electric motor employed. In other words, the power semiconductor switches are provided and configured to be capable of switching an electric current that corresponds to the current required for the phase windings of the electric motor being used.

In particular, during operation, an electrical voltage, which is intended for the provided voltage range for supplying the compressor, is present at the power semiconductor switch, provided it is in the electrically non-conductive state. These can be voltages from a few volts to about 1000 V. For example, the electrical voltage is 12 V, 24 V, or 48 V.

In particular, the electric refrigerant compressor is electrically contacted with the vehicle's electrical system, which, for example, carries an electrical voltage of 12 V, 24 V or 48 V. Alternatively, the electrical voltage that is present at the power semiconductor switch or that the electrical system has, is 288 V, 450 V, 650 V or 830 V.

The method provides that in a first working step, a first temperature of the power semiconductor is measured, for which in particular a temperature sensor is used. In other words, the temperature of the power semiconductor is determined directly, wherein, for example, a thermometer, a thermistor, or the like is used for this purpose. Alternatively, for this purpose, the heat radiation of the power semiconductor is detected.

In a second working step, which may take place, for example, simultaneously with the first working step, but also before or after it in time, a second temperature of the power semiconductor is determined. In particular, a time offset between the first and second working steps is less than or equal to 30 seconds, 20 seconds, 10 seconds, or 1 second. The second temperature is determined with use of a theoretical model of the motor-driven refrigerant compressor, in particular of the electric motor, for which, for example, an electric voltage applied to the power semiconductor, an operating period of the power semiconductor, and/or an electric current carried by the power semiconductor are used for the determination. Alternatively or preferably in combination therewith, a thermal model of the electromechanical structure and/or information on an expected speed, information that is available via the control of the motor-driven refrigerant compressor, is used for the determination. The information makes possible, in particular in connection with a detected, in particular measured, parameter of the electric current and/or the electric voltage, a model-based statement about the expected performance and the thereby expected second temperature. In particular, the number of switching operations performed by the power semiconductor switch is used. Suitably, a power loss of the power semiconductor is used to determine the second temperature. Expediently, the control signals, created by means of the PWM control, are used to determine the second temperature, if it is present. For example, the second temperature is determined using a characteristic diagram or a formula.

In a subsequent further working step, a difference between the first temperature and second temperature is determined. In other words, the deviation of the second temperature relative to the first temperature is determined, for which the second temperature is subtracted from the first temperature. In particular, in this case, the difference is determined with a sign, so that the difference is greater than zero (0), if the second temperature is less than the first temperature. In this way, a temperature input in the power semiconductor is determined, which would not be explained by the operation of the electric motor by means of the theoretical model. Such a temperature increase is thus caused due to a malfunction of other components of the electric motor, such as, for example, a mechanical malfunction of a compressor head of the refrigerant compressor. In an alternative thereto, the difference is determined without using a sign, therefore, the amount of the deviation between the two temperatures is determined, and thus, in particular, a target range of an expected value for the first temperature is determined. In this way, any malfunction within the refrigerant circuit can also be detected. In a further working step, a fault is detected if the difference is greater than a first threshold.

Due to the method, it is thus made possible to identify a fault of the mechanical components, before total failure of the motor-driven refrigerant compressor takes place. It is also possible to avoid overloading, which increases safety. In particular, the method is also used for operating other ancillary units of the motor vehicle, for example, an electric motor-driven seat adjustment or a radiator fan, for which the theoretical model is adapted accordingly. In other words, the invention is independent of the specific use within a refrigerant compressor.

In particular, the first threshold is determined using the currently calculated model. For example, 0° C. is used as the first threshold. In other words, a fault is detected if the second temperature does not exactly correspond to the first temperature. Expediently, the first threshold is always positive. In other words, cooling of the power semiconductor, for example, due to an energy transfer to a refrigerant conveyed by means of the motor-driven refrigerant compressor, is not taken into account due to an otherwise dissipation of thermal energy. Particularly preferably, the first threshold value is greater than or equal to 2° C., 5° C., or 10° C. Thus, short-term temperature fluctuations and/or a reduced/delayed heat conduction of components of the motor-driven refrigerant compressor are taken into account by means of the first threshold. In particular, the first threshold is less than or equal to 20° C., which is why excessive heating of the electric motor due to a malfunction is ruled out, which could otherwise lead to thermal failure, for example, of the power semiconductor or of the temperature sensor. Preferably, the second temperature is determined at a different time than the first temperature. In this way, a reduced/delayed heat conduction of components of the motor-driven refrigerant compressor is taken into account. In summary, the comparison is delayed in time. For example, the comparison occurs not only by adding a suitable tolerance compensation, in particular by adjusting the first threshold, but is also evaluated delayed in time.

Advantageously, power output of the electric motor is reduced if the first temperature is greater than a second threshold. For this purpose, a speed and/or torque of the electric motor are expediently reduced; in particular, the maximum output of the electric motor is reduced to a reduced output and consequently limited. The second threshold is expediently less than or equal to the specification-related threshold temperature for the power semiconductor used. For example, the second threshold is smaller or equal to 140° C., 130° C., 120° C., or 100° C. In this way, thermal damage of the power semiconductor or other components of the motor-driven refrigerant compressor due to an elevated temperature is substantially ruled out. Because the directly measured first temperature is used for this, a susceptibility to errors is reduced. In particular, the power is reduced by a suitable amount, in particular to at least half. Alternatively, the output is reduced to zero (0) and consequently the electric motor is stopped, at least until the first temperature is below the second threshold, preferably below the second threshold minus a suitable safety margin, such as 10° C., 20° C., or 5° C.

Suitably, a temperature of the refrigerant conveyed by the electric motor is determined based on the first temperature and the second temperature. In particular, the difference between the first temperature and second temperature is used for this purpose. Due to the refrigerant, thermal energy is supplied to or removed from the power semiconductor, in particular via a housing of the refrigerant compressor. Thus, due to the comparison between the first and second temperature, the thermal energy supplied or removed by means of the refrigerant can be determined. On the basis of the refrigerant volume conveyed by means of the motor-driven refrigerant compressor, it is thus made possible to determine the temperature of the refrigerant at least in a specific region of the motor-driven refrigerant compressor. For this purpose, no additional temperature sensor needs to be provided, which must be introduced into the volume flow of the refrigerant and must be chemically resistant to the conveyed refrigerant. As a result, manufacturing costs are reduced. The determination of the refrigerant temperature using the first temperature and second temperature, and in particular using a thermal model of the motor-driven refrigerant compressor, preferably the electric motor thereof, is independent of the detection of the fault and is in fact considered as an independent invention.

Preferably, a fault is detected if the temperature of the conveyed refrigerant is greater than a third threshold. Here, the third threshold is matched to the motor-driven refrigerant compressor and its area of application. The fault is detected if, therefore, sufficient cooling by the refrigerant compressor or other components of the refrigerant circuit no longer occurs. Consequently, a fault is detected even before a thermal malfunction occurs due to a lack of cooling, which further increases safety.

Preferably, the gradient of the difference is also determined. In particular, the first temperature is measured several times at time intervals, which are preferably the same, and compared with a respectively associated second temperature, which is determined using the theoretical model, for example, is calculated, with the formation of a difference in each case. If the change in the difference within a specified number of time intervals within which the difference was determined, thus, within which, for example, the measurement and model-based value determination of the two temperatures was made, exceeds a fourth limit, which, e.g., is suitably selected, and in particular a speed value is in temperature per unit time, for example, the fault is also detected, and preferably there is a power reduction or shutdown of the electric motor. In this way, there is both a static and dynamic overload detection, which ensures the operation of the motor-driven refrigerant compressor, in extreme situations as well. Alternatively or in combination therewith, a minimum operation can still be maintained even in the event of failure. In summary, in addition to the criterion of the (absolute) difference between the first temperature and second temperature (difference between the measured and calculated temperature), which is used in particular for power reduction or to shut down the unit, the gradient of the difference for determining the fault is also considered.

Preferably, the output of the electric motor is reduced if a fault is detected. For example, the output is reduced to 75%, 50%, or 25% of the rated output. In particular, the electric motor is stopped if a fault is detected. In this way, damage to other components of the motor vehicle, in particular the motor-driven refrigerant compressor, is ruled out. Alternatively or in combination therewith, a warning concerning this is issued when the fault is detected. In particular, this is output on a display of the motor vehicle, so that a driver of the motor vehicle is informed about the fault. In this way, it is made possible for the vehicle driver to shut down the motor vehicle before further damage to components of the motor vehicle takes place. The vehicle driver can also respond to a failure of a cooling capacity of the motor-driven refrigerant compressor and any refrigeration circuit connected thereto.

The motor-driven refrigerant compressor is a component of a motor vehicle and comprises an electric motor drive. The electric motor drive has an electric motor which is, for example, a brushless DC motor (BLDC). Preferably, the motor-driven refrigerant compressor is electrically contacted with an electrical system of the motor vehicle and/or operated with an electric voltage of a few volts up to 1000 V, in particular with an electric voltage of 12 V, 24 V, 48 V, 288 V, 450 V, 650 V, or 830 V. A refrigerant is compressed during operation by the motor-driven refrigerant compressor. The refrigerant is, for example, a chemical refrigerant such as R134a or R1234yf. Alternatively, the refrigerant is $CO_2$. Preferably, the refrigerant compressor is designed such that the respective refrigerant can be compressed by it, wherein, for example, there is an increase in pressure between 5 bar and 20 bar. The refrigerant compressor is in particular a component of a refrigeration circuit which serves, for example, for the air conditioning of an interior space or the cooling of an energy storage means of the motor vehicle, such as a high-voltage battery.

The motor-driven refrigerant compressor comprises a power semiconductor, in particular a power semiconductor switch. The power semiconductor is hereby provided and configured to switch an electric current with a current of at least 1 A, 2 A, 5 A, or 10 A. The power semiconductor is preferably a field-effect transistor (FET) or IGBT. The motor-driven refrigerant compressor preferably has an electronic inverter, which is supplied from a DC voltage network. The inverter has a power output stage, which in particular comprises the power semiconductor, preferably a number of such power semiconductors. The power semiconductor(s) can in particular switch the currents required for the required performance of the electric motor used. In particular, current is supplied to the electric motor by means of the power semiconductor, for which purpose preferably one terminal of the power semiconductor is electrically contacted with a winding of a stator of the electric motor. The power semiconductor is preferably a component of an output stage and/or is contacted with an electrical (intermediate circuit) capacitor. For example, the motor-driven refrigerant compressor comprises a number of such power semiconductors, which are electrically interconnected in a bridge circuit, for example, a B6 circuit. The motor-driven refrigerant compressor further comprises a temperature sensor thermally coupled to the power semiconductor. For example, the temperature sensor is mechanically directly located on the power semiconductor or is coupled by means of a thermal paste or a heating pad to the power semiconductor, and/or, in the possible switching pauses, the forward voltage of any freewheeling diode of the power semiconductor is measured, which is a measure of the first temperature present at the power semiconductor. Preferably, the motor-driven refrigerant compressor comprises a printed circuit board with the power semiconductor, and with the temperature sensor, which simplifies manufacture and positioning.

The motor-driven refrigerant compressor is operated according to a method in which a first temperature of the power semiconductor is measured, in particular by means of the temperature sensor. A second temperature of the power semiconductor is determined using a theoretical model of the motor-driven refrigerant compressor, for example, using a theoretical model of its electric motor, wherein in particular an operating time, an applied electrical voltage, a switched electric current, and/or a number of switching operations are used. A difference between the first temperature and second temperature is determined and/or the gradient of the difference exceeds a fourth threshold. A fault is detected if the difference is greater than a first threshold. Expediently, the motor-driven refrigerant compressor is suitable, and in particular provided and configured, to carry out the method and in particular operated such that the method is carried out.

For example, the motor-driven refrigerant compressor is coupled via signals to a BUS system, in particular a LIN or CAN bus. Preferably, outputting of the fault occurs via the BUS system. The method is also provided in particular for other ancillary units of the motor vehicle.

In particular, the motor-driven refrigerant compressor comprises a number of power semiconductors, which are in particular connected in parallel. In this way, an electric current carried by the respective power semiconductor is reduced, which reduces manufacturing costs. The power semiconductors are thermally coupled hereby to the same temperature sensor, wherein a switching group is formed by the power semiconductors and the temperature sensor. Consequently, an average of the temperature of the power semiconductors is measured by the temperature sensor. For example, between two and four power semiconductors are thermally coupled to the same temperature sensor. For example, the motor-driven refrigerant compressor comprises a number of switching groups each having a temperature sensor, wherein the switching groups are electrically contacted with each other in a bridge circuit. Alternatively, a complete bridge branch comprises only one of the switching groups.

A motor-driven refrigerant compressor of a motor vehicle, having a power semiconductor thermally coupled to a temperature sensor, is used to carry out a method in which a first temperature of the power semiconductor is measured, particularly by means of the temperature sensor. A second temperature of the power semiconductor is determined using a theoretical model of the motor-driven refrigerant compressor, suitably its electric motor, wherein in particular an operating time, an applied electrical voltage, a switched electric current, and/or a number of switching operations are used for this. A difference between the first temperature and second temperature is determined. A fault is detected if the difference is greater than a first threshold and/or the gradient of the difference exceeds a fourth threshold.

The motor vehicle comprises a refrigerant circuit with an (air conditioning) condenser, as well as with an evaporator, and with a motor-driven refrigerant compressor, which has a power semiconductor thermally coupled to a temperature sensor. The motor-driven refrigerant compressor is operated according to a method in which a first temperature of the power semiconductor is measured, in particular by means of the temperature sensor. A second temperature of the power semiconductor is determined using a theoretical model of the motor-driven refrigerant compressor, such as a theoretical model of its electric motor, wherein in particular an operating time, an applied electrical voltage, a switched electric current, and/or a number of switching operations are used for this. A difference between the first temperature and second temperature is determined. A fault is detected if the difference is greater than a first threshold.

The condenser is fluidically connected between the motor-driven refrigerant compressor and the evaporator. Preferably, the refrigerant circuit comprises a further heat exchanger, which is connected between the evaporator and the motor-driven refrigerant compressor, and which is preferably thermally contacted with a further component of the motor vehicle, such as a blower line of an air conditioner or an energy storage means, such as a high-voltage energy storage means. The refrigerant circuit is in particular filled with a refrigerant, for example, a chemical refrigerant such as R134a, R1234yf, or with $CO_2$.

By means of the refrigerant compressor, a pressure of the refrigerant is increased, which is subsequently passed to the condenser, which is preferably in thermal contact with the motor vehicle's environment. Preferably, a temperature equalization of the refrigerant to the ambient temperature or at least a decrease in the refrigerant temperature occurs by means of the condenser.

The refrigerant pressure is reduced by the downstream evaporator, which is why the temperature of the refrigerant is further reduced. In the further downstream heat exchanger, thermal energy is transferred from the component, thermally contacted with the further heat exchanger, to the refrigerant, resulting in a cooling of the component and heating of the refrigerant. The heated refrigerant is preferably again supplied to the refrigerant compressor to close the refrigerant circuit.

The refinements and advantages described in connection with the method are to be applied analogously to the motor-driven refrigerant compressor or the motor vehicle and vice versa.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

Parts corresponding to one another are provided with the same reference characters in all figures.

DETAILED DESCRIPTION

Figure 1:
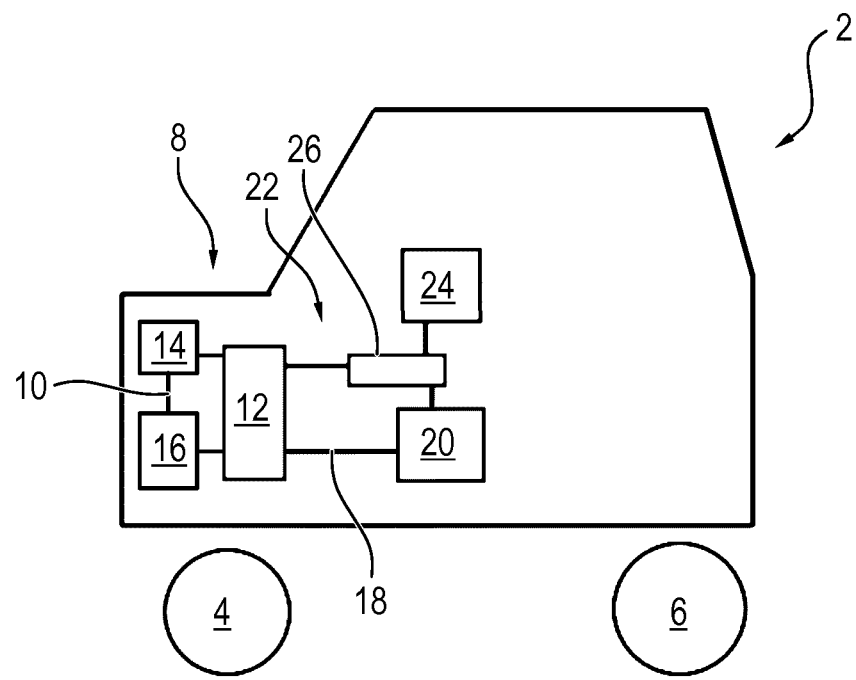
FIG. 1 schematically shows a motor vehicle with a refrigerant compressor.

A motor vehicle 2 with two front wheels 4 and two rear wheels 6 is shown schematically simplified in FIG. 1. At least two of the wheels 4, 6 are driven by means of a main drive, not shown in greater detail, for example, an internal combustion engine, an electric motor, or a combination thereof. Motor vehicle 2 comprises a refrigerant circuit 8, which is part of an air conditioning system. Refrigerant circuit 8 is filled with a refrigerant 10, for example, $CO_2$, R1234yf, or R134a. Refrigerant 10 is compressed by means of a motor-driven refrigerant compressor (eKMV [=electric refrigerant compressor]) 12 and fed into a condenser 14, which is connected fluidically downstream and acted upon by ambient air, which results in a decrease in the temperature of refrigerant 10. The pressure and therefore the temperature of refrigerant 10 are lowered by means of a downstream evaporator 16, which comprises a further heat exchanger, which is not shown in greater detail and is thermally coupled to a blower line of the air conditioning system. The blower line delivers cooled air into an interior of motor vehicle 2 as a function of a user setting.

Motor-driven refrigerant compressor 12 is coupled via signals to a motor vehicle control system 20, such as an on-board computer, by means of a bus system 18, which is a CAN bus system or a LIN bus system. Motor-driven refrigerant compressor 12 is energized by means of an electrical system 22, which carries the respective electric voltage, for example, 48 V, and is powered by a battery 24. Electrical system 22 further comprises a safety device 26, by means of which an electric current flow between battery 24 and refrigerant compressor 12 can be prevented. For this purpose, safety device 26 has, for example, a load switch and/or circuit breaker. Safety device 26 is connected by means of bus system 18 or otherwise via signals to motor vehicle control system 20, so that the load switch or circuit breaker can be actuated by means of motor vehicle control system 20 and therefore the electric current flow can be prevented.

Figure 2:
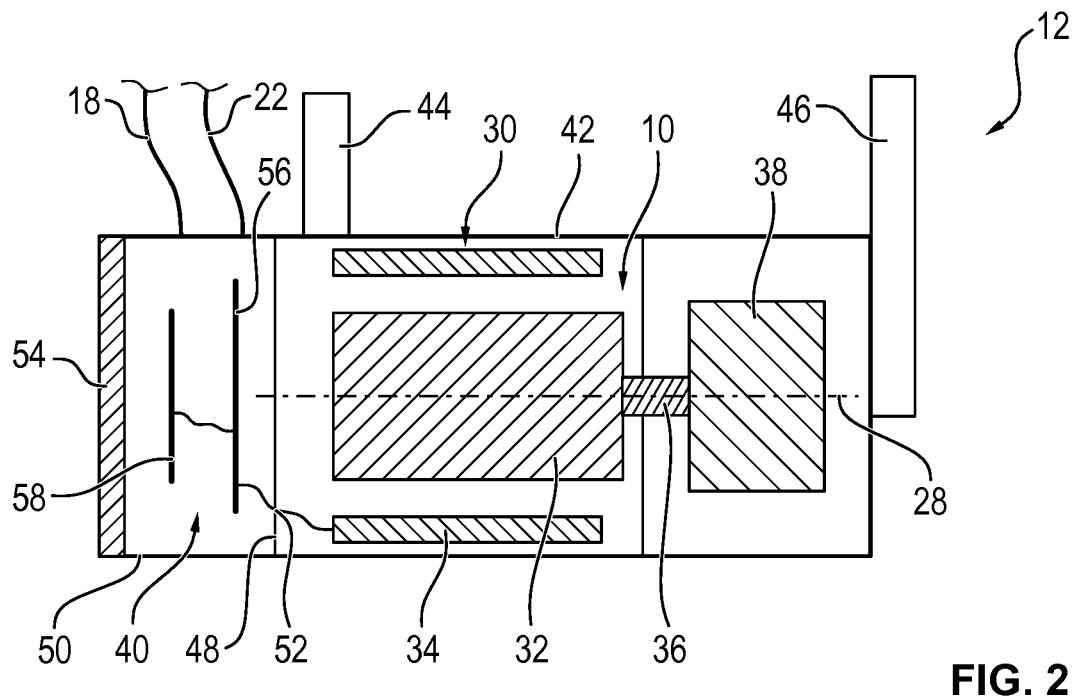
FIG. 2 shows the refrigerant compressor schematically simplified in a sectional view.

FIG. 2 shows motor-driven refrigerant compressor 12 in a sectional view along a rotation axis 28 of an electric motor 30 of refrigerant compressor 12. Electric motor 30 has a cylindrical rotor 32, which is circumferentially surrounded by a hollow cylindrical stator 34. Rotor 32 comprises a number of permanent magnets and is rotatably mounted about rotation axis 28 by means of a shaft 36. A compressor head 38, for example, a scroll compressor, is connected nonrotatably on the free end on shaft 36. Stator 34 is energized by means of an electronic system 40 which is connected to bus system 18 and electrical system 22.

Electric motor 30, compressor head 38, and electronic system 40 are arranged in a housing 42 made of die cast aluminum, which has a substantially hollow cylindrical shape and is concentric with rotation axis 28. Housing 42 includes an intake 44 via which refrigerant 10 enters housing 42 and is drawn along electric motor 30 to compressor head 38, by means of which an increase in pressure takes place. Refrigerant 10 compressed by means of compressor head 38 is conveyed out of housing 34 by means of an outlet 46.

Housing 42 comprises a partition wall 48, by means of which an electronics housing 50 is separated from the part of housing 42 through which refrigerant 10 flows. Electronics 40 are arranged within electronics housing 50. Partition wall 48 has a feedthrough 52, which is pressure-tight and by which the energization of stator 34 takes place. On the side opposite partition wall 48 in the axial direction, therefore, parallel to rotation axis 28, electronics housing 50 comprises a housing cover 54, which is made of a metal, is releasably secured by screws to other components of the electronics housing 50, and closes an opening of electronics housing 50.

Figure 3:
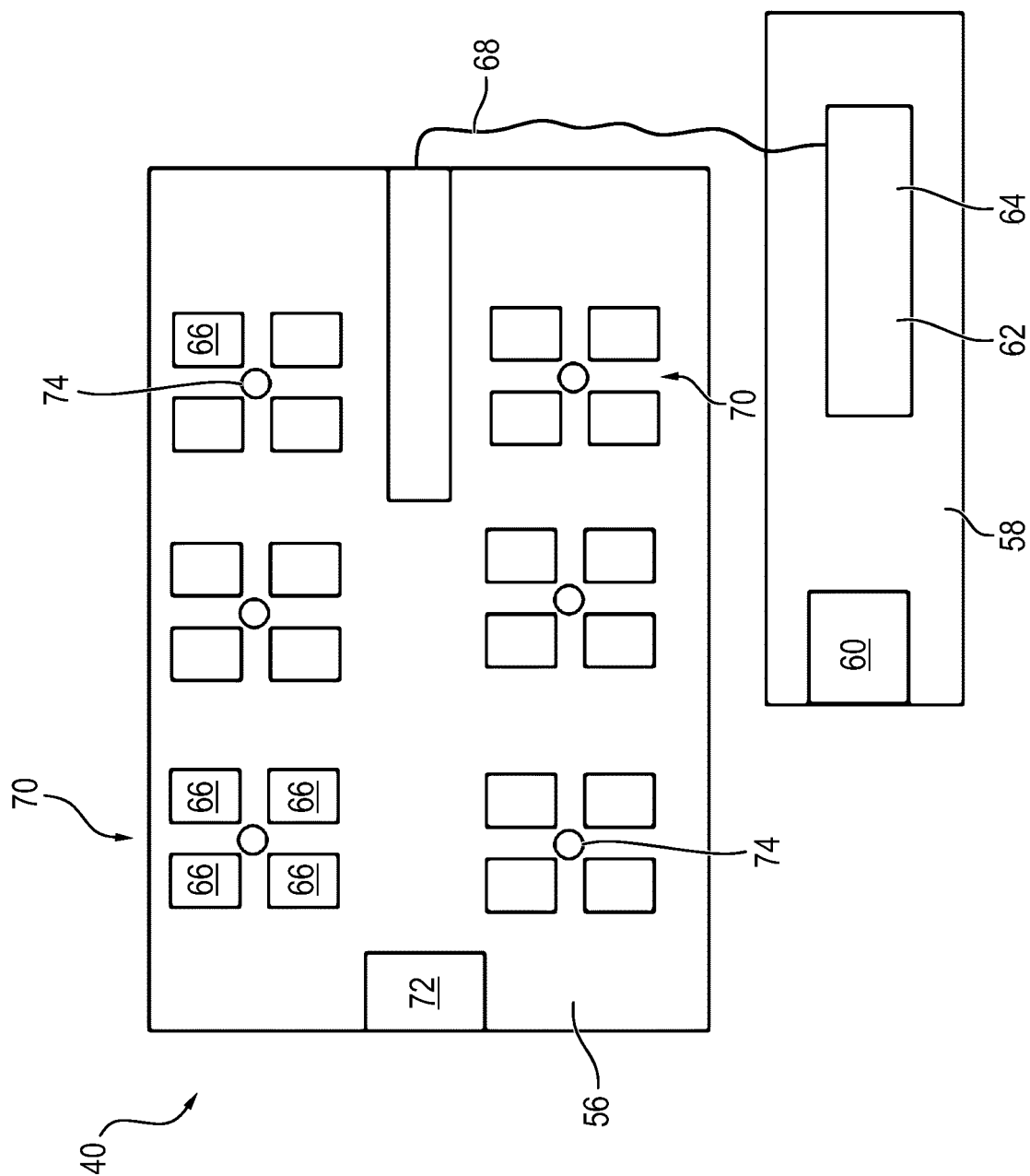
FIG. 3 is a top plan view of a circuit board and a further circuit board of the refrigerant compressor, with a number of power semiconductors and temperature sensors.

In FIG. 3, electronics 40 are shown in a top plan view. Electronics 40 have a circuit board 56 and a further circuit board 58, which, as shown in FIG. 2, are arranged one above the other in the axial direction, therefore, parallel to rotation axis 28. Circuit board 56 is arranged parallel to partition wall 48 and housing cover 54, like the further circuit board 58. Here, circuit board 56 is disposed between further circuit board 58 and partition wall 48. In FIG. 3, the two circuit boards 56, 58 are shown offset in the radial direction. The further circuit board 58 has a bus interface 60, to which bus system 18 is connected. A microprocessor 62 of further circuit board 58, which has a drive circuit 64 for power semiconductor switches 66 of circuit board 56, is coupled via signals to bus interface 60. For this purpose, the two circuit boards 58, 56 are coupled via signals by means of a control line 68. Power semiconductors 66 are power semiconductor switches, wherein in each case four power semiconductor switches 66, which are made as a field-effect transistor (FET), are combined to form a switching group 70. Overall, six switching groups 70 are formed here. In other words, circuit board 56 has forty-eight power semiconductor switches 66, by means of which an electric current of up to 5 A or more can be switched.

Circuit board 56 has a power connection 72, to which electrical system 22 is connected. Therefore, the current flow, provided by electrical system 22, for energizing stator 34 is switched by means of semiconductor switches 66, wherein the individual switching groups 70 are electrically contacted with each other in a bridge circuit. By means of switching groups 70, therefore, a pulse-width-modulated voltage signal or current signal is provided for stator 34. In this case, power semiconductors 66 of switching groups 70 are connected in parallel to one another, but at least two of power semiconductor switches 66 of each of switching groups 70 are connected in parallel to one another, wherein in particular the remaining part of a bridge arm is formed hereby by means of the remaining two power semiconductor switches 66. In other words, in this case, a bridge branch of a bridge circuit is formed by power semiconductors 66 of each switching group 70.

Each switching group 70 further has a temperature sensor 74, which is thermally coupled to all semiconductor switches 66 of the respective switching group 70. As a result, it is made possible by means of temperature sensor 74 to measure the average temperature of switching group 70. For example, the components of each switching group 70 are thermally contacted with each other by means of a thermal paste or a heating pad. Each of switching groups 70 further includes, for example, a capacitor (not shown in greater detail), or is contacted with it electrically. For example, an output stage is formed with each of switching groups 70.

Figure 4:
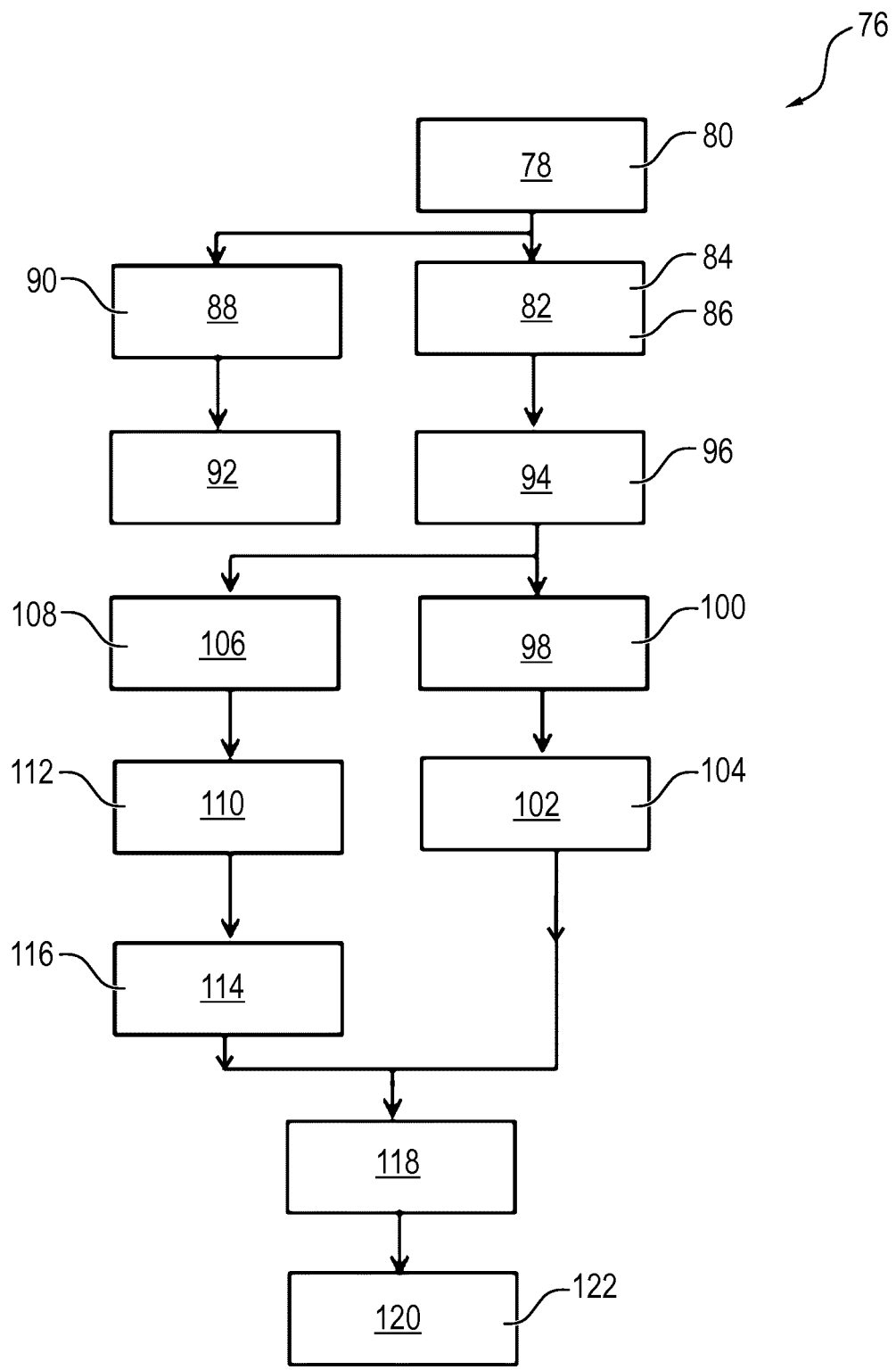
FIG. 4 shows a method for operating the refrigerant compressor.

A method 76 for operating motor-driven refrigerant compressor 12, which is in particular carried out by microprocessor 62, is shown in FIG. 4. In a first working step 78, a first temperature 80 is measured by means of one of the temperature sensors 74. Here, first temperature 80 is substantially the same as the temperature of one of the power semiconductor switches 66 of switching group 70 or the average temperature of all power semiconductor switches 66 of just this switching group 70. In a second working step 82, which takes place concurrently, a second temperature 84 of this power semiconductor switch 66 is determined, for which a theoretical model of motor-driven refrigerant compressor 12 is used. Heating of semiconductor switch 66 or of switching group 70 is taken into account by means of theoretical model 86 as a function of a previous operating time and power, output by electric motor 30, as well as the speed. Consequently, a theoretical heating of semiconductor switch 66 is determined as a function of the electric current switched by the particular semiconductor switch 66. Theoretical model 86 is stored in microprocessor 62 and takes into account the control signals generated by control circuit 64.

In a third working step 88, which is carried out as soon as first temperature 80 is available, first temperature 80 is compared with a second threshold 90 which lies between 100° C. and 140° C., and is, for example, 130° C. If first temperature 80 is greater than the second threshold, in a fourth working step 92, the output of electric motor 30 is reduced, for which purpose the speed of electric motor 30 and/or the torque output by electric motor 30 are reduced and then limited.

Once the first and second working steps 78, 82 have been performed, a fifth working step 94 is carried out in which a difference 96 between first temperature 80 and second temperature 84 is determined, for which second temperature 84 is subtracted from first temperature 80. In a subsequent sixth working step 98, the difference 96 is compared with a first threshold 100, which is between 2° C. and 20° C., and is, for example, 5° C. If difference 96 is greater than first threshold 100, therefore, if second temperature 84 is greater than first temperature 80 by the first threshold value 100, a fault 104 is detected in a seventh working step 102.

Parallel to the sixth working step 98, a temperature 108 of refrigerant 10, which is conveyed by means of electric motor 30 and is compressed by means of compressor head 38, is determined in an eighth working step 106 on the basis of first temperature 80 and second temperature 84. To this end, for example, difference 96 and theoretical model 86 or a different theoretical model are used, in which the temperature determination is carried out in particular depending on the coefficient of thermal conductivity of partition wall 48 and depending on the thermal coupling of circuit board 56 to electronics housing 50 and/or partition wall 48. To determine temperature 108 of refrigerant 10, it is considered that a heat transfer takes place between power semiconductor switches 66 and refrigerant 10. In other words, power semiconductor switches 66 are heated or cooled by this due to an indirect coupling to refrigerant 10. In a subsequent ninth working step 110, temperature 108 of refrigerant 10 is compared with a third threshold 112. In a subsequent tenth working step 114, a fault 116 is detected if temperature 108 of refrigerant 10 is greater than third threshold 112.

Further, a fault is detected if first temperature 80 changes more rapidly than second temperature 84. For this purpose, difference 96 is determined in particular successively in time, and a gradient of difference 96 is determined. In summary, therefore, the fault is detected not only if the (absolute) difference 96 exceeds first threshold 100 (outside the expected limit), but also if the gradient exceeds a predetermined fourth threshold.

As soon as a fault 104, 116 has been detected, an eleventh working step 118 is carried out, in which electric motor 30 is stopped. In other words, all power semiconductor switches 66 are shifted to an electrically nonconductive state. Further, a twelfth working step 120 is carried out in which a warning 122 is output. The warning is transmitted by bus system 18 to on-board computer 20 and output by means of it on a display in the interior of motor vehicle 2 and it thus signals the driver of motor vehicle 2. Method 76 is carried out in particular for each of power semiconductor switches 66 or each of switching groups 70, preferably parallel in time. In other words, method 76 is executed by microprocessor 62 six times in parallel.

The invention is not limited to the exemplary embodiment described above. Rather, other variants of the invention can also be derived herefrom by the skilled artisan, without going beyond the subject of the invention. Particularly, further all individual features described in relation to the exemplary embodiment can also be combined with one another in a different manner, without going beyond the subject matter of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for operating a motor-driven refrigerant compressor of a motor vehicle, the method comprising:
    measuring a first temperature of a power semiconductor,
    determining a second temperature of the power semiconductor using a theoretical model of the motor-driven refrigerant compressor,
    determining a difference between the first temperature and second temperature, and
    determining whether a fault has occurred based on the difference.

2. The method according to claim 1, wherein when the difference between the first temperature and the second temperature is greater than a first threshold, it is determined that the fault has occurred, wherein the first threshold is selected as greater than 2° C., 5° C., or 10° C. and less than 20° C.

3. The method according to claim 1, further comprising reducing the output of the electric motor based on the first temperature, wherein the output of the electric motor is reduced when the first temperature is greater than a second threshold.

4. The method according to claim 1, further comprising determining a temperature of a refrigerant conveyed by the electric motor based on the first temperature and second temperature.

5. The method according to claim 4, wherein it is determined that the fault has occurred if the temperature of the refrigerant is greater than a third threshold.

6. The method according to claim 1, further comprising at least one of stopping the electric motor or outputting a warning based on the fault determination.

7. The method according to claim 1, wherein when a gradient of the difference between the first temperature and the second temperature exceeds a fourth threshold, it is determined that a fault has occurred.

8. The method according to claim 1, wherein the determination of the second temperature of the power semiconductor using a theoretical model of the motor-driven refrigerant compressor includes an electric voltage applied to the power semiconductor, an operating period of the power semiconductor, an electric current carried by the power semiconductor, a thermal model and/or information about an expected speed.

9. A motor-driven refrigerant compressor of a motor vehicle, said compressor comprising:
    a temperature sensor;
    a power semiconductor thermally coupled to the temperature sensor,
    the compressor being configured to: measure a first temperature of the power semiconductor, determine a second temperature of the power semiconductor using a theoretical model of the compressor, determine a difference between the first temperature and the second temperature, and detect a fault based on the difference between the first temperature and the second temperature.

10. The motor-driven refrigerant compressor according to claim 9, further comprising two to four of the power semiconductor, the two to four of the power semiconductor all being thermally coupled to the temperature sensor.

11. The motor-driven refrigerant compressor according to claim 9, wherein the compressor is configured to determine a temperature of a conveyed refrigerant based on the first temperature, the second temperature and a refrigerant volume conveyed by the compressor.

12. Use of a motor-driven refrigerant compressor according to claim 9 for carrying out a method according to claim 1.

13. A motor vehicle having a refrigerant circuit, which comprises a condenser and an evaporator and a motor-driven refrigerant compressor according to claim 9.

* * * * *